Oct. 25, 1932.  J. F. WINDSOR  1,884,465
WELDING APPARATUS
Filed June 6, 1930   2 Sheets-Sheet 2

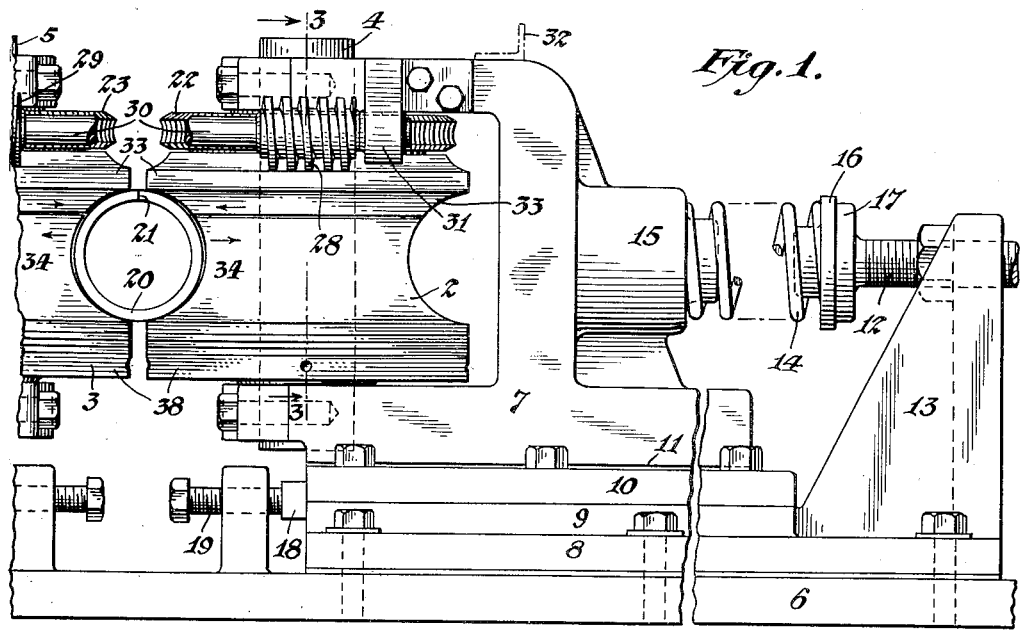

Inventor
John F. Windsor
By his Attorney
Clarence D. Kerr

Patented Oct. 25, 1932

1,884,465

UNITED STATES PATENT OFFICE

JOHN F. WINDSOR, OF CHICAGO, ILLINOIS, ASSIGNOR, BY MESNE ASSIGNMENTS, TO CLAYTON MARK & COMPANY, OF CHICAGO, ILLINOIS, A CORPORATION OF DELAWARE

WELDING APPARATUS

Application filed June 6, 1930. Serial No. 459,481.

This invention relates to the welding of metal pipe or tubing. One of the objects of the invention is the provision of improved means whereby tube or pipe stock may be welded and at the same time pitting of the stock and cooperating contact elements avoided. In carrying out my invention I have provided a pair of horizontal electrode rolls adapted to support the seamed tube stock, to compress the stock so that the edges of the seam are forced firmly together, and to pass current across the seam of said stock for effecting the welding. I avoid pitting of the stock and the electrode rolls by driving, in the opposite direction to the travel of the stock, the portions of the rolls through which current is passed across the seam. At the same time I so construct the rolls that the tube stock supporting and compressing portions thereof are free to rotate in the direction of travel of the stock. In this way, I obtain a simple and highly effective tube welding apparatus whereby only a single pair of rolls need be employed for compressing and welding the tube stock, pitting of the stock is obviated by rotation of the electrode portions of the rolls in the direction opposite to that of the travel of the stock, and a substantial saving of power is accomplished by provision for rotation of the tube supporting and compressing portions of the rolls in the direction of travel of the stock. Other features of the invention will be hereinafter described and claimed.

In the accompanying drawings:

Fig. 1 is a view in side elevation of welding apparatus embodying my invention, part of one of the welding rolls and associated structure being shown fragmentarily.

Fig. 2 is a plan view of the apparatus shown in Fig. 1.

Figure 3:
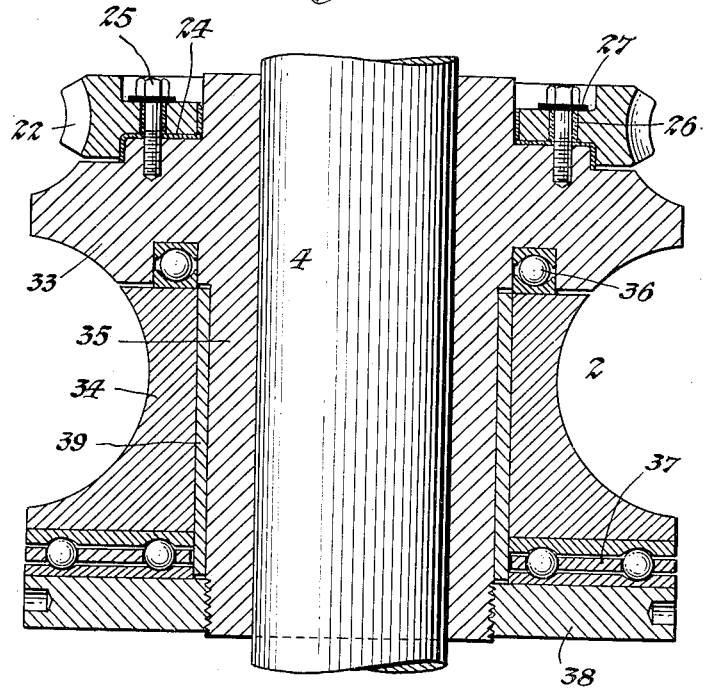
Fig. 3 is a view in vertical section of one of the improved welding rolls.

Referring to the drawings, my improved welding rolls 2, 3, are shown rotatable about stationary vertical shafts 4, 5, respectively, which may be mounted in any suitable way on a base plate 6. Thus, in the example shown, the shaft 4 is mounted in a block 7 which may be slidably engaged with a plate 8 suitably secured to and insulated from the base plate 6. The plate 8 may conveniently be formed with upwardly extending side members 9 to which are secured flange elements 10 which project into grooves 11 in the sides of the block 7 whereby the latter is retained on said plate and is at the same time slidable thereon, as will be readily apparent. Inasmuch as the rolls 2, 3 are duplicates and may each be mounted in the same way, only a portion of the roll 3 and associated elements is shown in Figs. 1 and 2. For adjusting the rollers 2, 3 to different positions with respect to each other means such as that shown in connection with block 7 may be provided, such means consisting of a screw 12 threaded thru an upstanding flange 13 on the supporting plate 8 and cooperating with the block 7 for causing shifting of the latter. A spring 14 may be interposed between said screw and said block as shown, said spring seating at one end upon an extension 15 on the block 7 and at its other end against a washer or spring seat member 16 which bears against a flange 17 on the screw 12. The extent of adjustment of each roll may be limited in any suitable way as by an insulating stop 18 carried by a screw 19 as shown in connection with roll 2.

Figure 4:
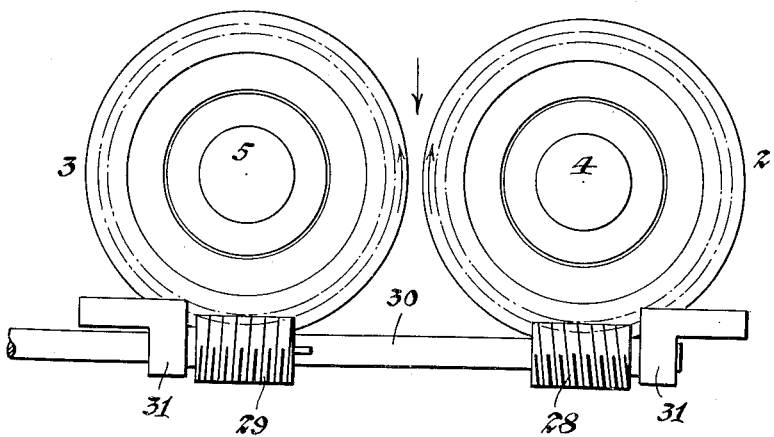
Fig. 4 is a diagrammatic plan view showing the welding rolls and their associated driving means.

The rolls 2, 3, serve a three fold purpose. In the first place, through their grooved peripheries they support the tube or pipe stock 20, as shown; in the second place they serve to compress the stock so as to press the edges of the seam cleft 21 firmly together, and in the third place they form electrodes for passing current across the abutting edges of the seam and thereby effecting welding thereof. The tube stock may be fed between the rollers 2, 3, in any suitable or convenient way; as for example by the usual forming rollers (not shown) which, as is well understood in the art shape the tube blank or skelp into tubular form and cause the formed tubing to travel past the means which effects the welding thereof. In my pending application, Serial 390,929, filed September 7, 1929, I have disclosed a process for eliminating pitting of tube stock and electrode rolls by providing slippage between the same; a particularly effective way of accomplishing this result being to drive the electrode rolls in a direction opposite to the travel of the tube stock. For driving the rolls 2, 3, of the present application in a direction opposite to that of the travel of the stock 20, and thus avoiding pitting of said stock and rolls, I secure to each of the rolls 2, 3, a corresponding one of a pair of worm wheels 22, 23. As shown in Fig. 3, each of the worm wheels is suitably insulated from its associated roll by insulating material 24; and the bolts 25 whereby each worm wheel is secured to its roll are insulated from said wheel, as shown, by bushings 26 and washers 27. The respective worm wheels 22, 23, are engaged by worms 28, 29 on a shaft 30 rotatably mounted in bearing elements 31, 31. The latter may be secured to the respective blocks 7 in which the rolls are mounted. In order to permit adjustment of the rolls with respect to each other, the shaft 30 extends a substantial distance through its bearing 31 and is slidable therein, and the worm 29 may be splined to said shaft so that the shaft and said worm will rotate together but the shaft may move longitudinally with respect to the worm. The shaft 30 may be operated in any suitable and convenient way for driving the rolls in the opposite direction to the travel of the stock. For example, said shaft may be driven by a motor through the worm wheel and a worm splined to said shaft, as will be apparent. The worms 28, 29, as shown, are oppositely threaded and the directions of rotation imparted thereby to the rolls 2, 3, as compared with the direction of travel of the tube stock, are indicated by the arrows in Fig. 4.

Current for welding may conveniently be conducted to the rolls 2, 3, through the respective bearing blocks 7 for said rolls. Thus, as indicated at 32 in Fig. 1, a bus bar for the welding current is secured to the top of the block 7 for the roll 2 and it will be understood that a similar bus bar may be secured to the similar bearing block in which roll 3 is mounted, so that current may be passed from a source of current supply to one of said bearing blocks and its associated roller, thence across the seam in the tube stock to be welded to the other roller, and thence through the bearing block for the latter roller and back to the source of current supply.

It has been noted that the rolls 2, 3 not only pass current across the seam of the tube stock to be welded but also support said stock and apply pressure thereto to force the edges of the stock into firm engagement with each other. I provide for rotation of the tube-stock compressing and supporting portions of the rolls with respect to the electrode portions thereof. As shown in Fig. 3, the rolls each comprise a main or electrode portion 33 and a portion or segment 34 for supporting and compressing the tube-stock. The electrode portion 33 and segment 34 have, as shown, peripheries curved to correspond with the curvature of the tubing 20. The electrode section 33 which may be of electrical conducting material of high conductivity, such as bronze, has an axially extending sleeve portion 35 which provides a large electrical contact area with the stationary shaft 4. The segment 34 surrounds the extension 35 and is free to rotate about the same. The compression segment 34 may be of steel or similar suitable material and is shown mounted vertically between two sets of ball bearings 36, 37. A ring 38, threaded upon the end of the sleeve or extension 35, maintains the ball bearing units and compression segment 34 in position. A sleeve 39 of steel or similar material may be interposed as shown between the extension 35 and segment 34 for receiving wear from said segment as the latter rotates, thus protecting the extension 35 which is of softer metal. Also, if desired the segment 34 may be suitably insulated from the extension 35, as by interposing a sleeve of insulating material between said segment 34 and the sleeve 39. The bearing units may also be insulated if desired, as will be obvious. For example, a washer of insulating material may be inserted between the lower race of bearing unit 36 and the top of segment 34 and another washer of insulating material between the lower race of unit 37 and the ring 38.

In the operation of the construction above described, the worms 28, 29, drive the electrode segments 33 in the direction opposite to that in which the tube stock 20 is traveling. At the same time the compression segments 34, which are exerting pressure upon the tubing to press the edges of the seam firmly together and are thus under substantial stress, are free to revolve in the direction of travel of the stock. The avoidance of pitting of the stock and rolls is thus accomplished with a minimum expenditure of power. In other words, through the foregoing construction the advantage of obviating pitting is obtained without the necessity of driving the entire roll under substantial stress against the direction of travel of the stock. The invention is especially advantageous in the welding of thick walled tubing or pipe in conjunction with which the pressure portions of the rolls are under particularly great stress in forcing the edges of the seam together.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed.

I claim:

1. A welding roll comprising means engageable with tube stock for supplying current thereto, means extending axially from the first mentioned means, and peripherally grooved means engageable with the tube stock and extending radially with respect to said axially extending portion, said first mentioned means and said peripherally grooved means being so constructed and arranged that one is rotatable with respect to the other.

2. A welding roll comprising an axially extending portion and an electrode portion projecting radially therefrom, a tube stock supporting member mounted for rotation about said axially extending portion, said member having means extending therefrom for underlying the stock to support the latter, and means for maintaining said member in position on said axially extending portion.

3. A welding roll comprising an axially extending portion and an electrode portion projecting radially therefrom, a tube stock supporting member mounted for rotation about said axially extending portion, said member having means extending therefrom for underlying the stock to support the latter, means for maintaining said member in position on said axially extending portion, and anti-friction means interposed between said second mentioned means and said member.

4. In apparatus for welding tube stock, a pair of rolls mounted for rotation about vertical axes, said rolls having electrode portions and tube stock supporting portions rotatable with respect to said electrode portions, and means for rotating said electrode portions in a direction opposite to that of the travel of the tube stock.

5. In apparatus for welding tube stock, a welding roll comprising an axially extending portion, and a portion projecting radially with respect thereto for supplying current to tube stock, a tube stock holding portion grooved for cooperation with the stock and extending radially with respect to said axially extending portion, the parts being so constructed and arranged that the tube stock holding portion is rotatable with respect to the first mentioned portion.

6. In apparatus for welding tube stock, a welding roll comprising electrode and tube-compression portions, means for rotating the electrode portion in the direction opposite to the travel of the stock, and means whereby the tube-compression portion is free to travel with the stock.

7. In apparatus for welding tube stock, a welding roll having portions with peripheries curved to provide a groove adapted to receive tube stock to be welded, said portions including flanges adapted to extend respectively above and below said tube stock, said portions being so constructed and arranged that one thereof is rotatable with respect to the other.

8. In apparatus for welding tube stock, a welding roll having portions with peripheries curved to provide a groove adapted to receive tube stock to be welded, said portions including flanges adapted to extend respectively above and below said tube stock, and means projecting axially from one of said portions and engaged by the other of said portions to provide for relative rotation between said portions.

9. In apparatus for welding tube stock, a welding roll having portions with peripheries curved to provide a groove adapted to receive tube stock to be welded, said portions including flanges adapted to extend respectively above and below said tube stock, and means projecting axially from one of said portions and engaged by the other of said portions to provide for relative rotation between said portions, and means for maintaining said other portion in position on said axially projecting means.

10. In apparatus for welding tube stock, a welding roll having portions with peripheries curved to provide a groove adapted to receive tube stock to be welded, said portions including flanges adapted to extend respectively above and below said tube stock, and means projecting axially from one of said portions and engaged by the other of said portions to provide for relative rotation between said portions, anti-friction means cooperating with said other portion, and means for maintaining said other portion in position on said axially projecting means.

In testimony whereof, I have signed my name to this specification this third day of June, 1930.

JOHN F. WINDSOR.